United States Patent [19]

Constantinides

[11] 4,320,397
[45] Mar. 16, 1982

[54] ECHO TRACKER/RANGE FINDER FOR RADARS AND SONARS

[76] Inventor: Robert A. Frosch, Administrator of the National Aeronautics and Space Administration, with respect to an invention of Nick J. Constantinides, Pasadena, Calif.

[21] Appl. No.: 53,572

[22] Filed: Jun. 29, 1979

[51] Int. Cl.³ .................................................. G01S 13/12
[52] U.S. Cl. ................... 343/7.5; 343/5 DP; 343/17.1 PF; 356/5; 367/95
[58] Field of Search ............... 343/5 DP, 7.5, 17.1 PF

[56] References Cited

U.S. PATENT DOCUMENTS

| | | | |
|---|---|---|---|
| 2,542,983 | 2/1951 | Beatty | 343/7.5 |
| 2,568,926 | 9/1951 | Moran, Jr. | 343/7.5 |
| 2,981,942 | 4/1961 | Gross | 343/7.5 |
| 3,334,344 | 8/1967 | Colby, Jr. | 343/7.5 |
| 3,660,845 | 5/1972 | Pettersson | 343/5 DP X |
| 3,739,379 | 6/1973 | Davis | 343/17.1 PF X |
| 4,074,223 | 2/1978 | Eggleton et al. | 343/5 DP X |

*Primary Examiner*—T. H. Tubbesing

[57] ABSTRACT

An echo tracker/range finder or altimeter in which the pulse repetition frequency (PFR) of a predetermined plurality of transmitted pulses is adjusted so that echo pulses received from a reflecting object are positioned between transmitted pulses and divide their interpulse time interval into two time intervals having a predetermined ratio with respect to each other. The thus-adjusted PRF is related to the range of the reflecting object. More specifically, the invention provides a means whereby the arrival time of a plurality of echo pulses is defined as the time at which a composite echo pulse formed of a sum of the individual echo pulses has the highest amplitude. This arrival time is determined by dividing an interpulse time interval between adjacent transmitted pulses into a predetermined plurality of corresponding time increments. The sum of a plurality of echo pulse portions occurring within each corresponding time increment defines the composite echo pulses, the time increment containing the highest sum defining the arrival time for the plurality of echo pulses. Having determined the arrival time with respect to the interpulse time period, the transmitted PRF is automatically adjusted so that the arrival time divides the interpulse time interval in accordance with a predetermined ratio, this PRF then being related to the range or altitude of the reflecting object. The invention is applicable to radar systems, sonar systems, or any other kind of system in which pulses are transmitted and echoes received therefrom.

16 Claims, 6 Drawing Figures

ECHO TRACKER/RANGE FINDER FOR RADARS AND SONARS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

The invention relates to sonar and radar ranging and altimetry systems.

BACKGROUND OF THE INVENTION

An orbiting spacecraft frequently relies on ground processing equipment to generate signals for correcting its orbital path and adjusting its altitude. These corrections are typically derived from theoretically predicted values, referred to as "predicts", and up-linked to the spacecraft's navigation and guidance system. Synthetic aperture imaging radars usually depend upon spacecraft altitude data to produce good image fidelity of targets. Many spacecraft do not have onboard altimeters, and imaging radars must derive their data from non-real time predicts. The predicts are then used in an informational feedback loop with the spacecraft's guidance system to produce spacecraft orbital corrections. For an earth tracking imaging radar, pointing corrections for the imaging radar antenna are affected by the spacecraft's attitude (i.e. pitch, yaw, altitude and earth's rotation). Whereas pitch, yaw and earth's rotation errors can be compensated by other means, altitude produced pointing errors can be compensated either by changing the spacecraft's altitude or by changing the pulse repetition frequency (PRF) of the imaging radar. In the later case, the radar parameters are changed by earth command to accommodate predicted variations in altitude. These predicted variations in altitude are frequently somewhat in error and thus affect the quality of the radar image obtained, i.e. produce ambiguities during data correlation. This problem is especially apparent with synthetic aperture radars where accurate altitude information is essential in order to successfully correlate the radar return signals. The present invention provides an echo tracking/ranging system which can be utilized in an orbiting spacecraft to rapidly provide accurate tracking and altitude information. However, the echo tracking/ranging system of the invention can be utilized in any system which transmits pulses and receives echo pulses from a target whose signature and/or range is to be determined. Thus, the invention can be utilized in conjunction with radar, pulsed laser or sonar systems.

SUMMARY OF THE INVENTION

The invention provides an echo tracking/ranging system in which the pulse repetition frequency (PRF) of a predetermined plurality of transmitted pulses is adjusted so that reflected or echo pulses from a reflecting object are positioned between contiguous transmitted pulses and divide each of their interpulse time intervals into two time intervals having a predetermined ratio with respect to each other. The thus-adjusted PRF is related to the range of the reflecting object. Thus, rather than measuring time from transmission of a pulse to receipt of an echo pulse in order to determine range of the reflecting object, the system provided by the present invention adjusts the pulse repetition frequency of the transmitter so that the interval between each pair of transmitted pulses is divided in accordance with a predetermined ratio. This pulse repetition frequency change is then utilized to determine the range of the object or area creating the echo pulse or pulses. The reflecting object can be either moving or stationary.

As can be appreciated, the accuracy of the range determination is dependent upon the accuracy that the echo pulse arrival time with respect to the interpulse time interval can be determined. The invention provides a means whereby an interpulse time interval is divided into a predetermined plurality of time increments, the amplitude of an echo pulse portion occurring during each time increment being digitized and stored in a read/write memory system. At the end of the interpulse time interval, the time increment containing the highest echo amplitude pulse portion is used to identify the time of arrival of the echo pulse, this time being used to adjust the PRF of the transmitted pulses as previously explained. In an embodiment in which a plurality of echo pulses are used for each PRF adjustment, each of a predetermined plurality of interpulse time intervals are divided into a predetermined plurality of corresponding time increments. The amplitude of each echo pulse portion occurring during each of the predetermined plurality of corresponding time increments is determined. The echo pulse portions in corresponding time increments of each interpulse time interval are summed and stored. The echo pulse portion sums thus define a composite echo pulse, the time increment having the highest value defining the time of arrival of the composite echo pulse. This time of arrival is then utilized to adjust the PRF of the transmitted pulses so that the time of arrival of the composite pulse would have divided the interpulse time intervals into two intervals having a predetermined ratio with respect to each other. The new PRF is then used to determine the range of the reflecting object. In a specific application, the PRF is adjusted so that the interpulse time interval is divided into two equal portions. The system provided by the invention can be readily adapted for use in aircraft or spacecraft, and can be used in conjunction with pulsed, side looking imaging and synthetic aperture radars, or in any application where accurate range or altitude information is required. The invention can also be used in conjunction with sonar systems where the range of a sound-reflecting surface is to be determined.

DETAILED DESCRIPTION

Detailed illustrative embodiments of the invention are disclosed herein which exemplify the invention and are currently considered to be the best embodiments for such purposes However, it is to be recognized that other means for defining the arrival time of an echo pulse could be utilized. Accordingly, the specific embodiments disclosed are only representative in providing a basis for the claims which define the scope of the present invention.

As previously explained, the invention provides an echo-tracker/altimeter or ranging system which can be used in conjunction with radar, laser or sonar systems. The echo tracking portion of the system provides a means for dividing each echo pulse reflected from an object or area whose range is to be determined into a plurality of time increments, the amplitude of the echo pulse portion occurring within each time increment being measured and stored. The amplitude of each echo pulse portion occurring within each of the time increments is compared with the amplitude of the echo pulse portions occurring within a succeeding increment, thereby determining the time increment contaning the highest amplitude. This increment then is defined as the time of arrival for that echo pulse. In one embodiment of the invention, a plurality of echo pulses are divided into a predetermined number of corresponding time increments, the amplitudes falling within each corresponding time increment being summed and stored. The stored sums define a composite echo pulse and the time increment having the highest amplitude defines the time of arrival for the plurality of echo pulses. The ranging portion of the system then adjusts the pulse repetition frequency (PRF) of the transmitted pulses so that the time of arrival of the composite echo pulse would have divided an interpulse time interval between two transmitted pulses into two time increments having a predetermined ratio with respect to each other. In a specific embodiment, the PRF is selected so that the composite echo pulse arrival time would divide the interpulse time interval into two equal time increments. Thus, the PRF is directly related to the range of a reflecting object. As can be appreciated, the preciseness of the range determination will be a function of the number of time increments into which each interpulse time interval is divided.

Figure 1:
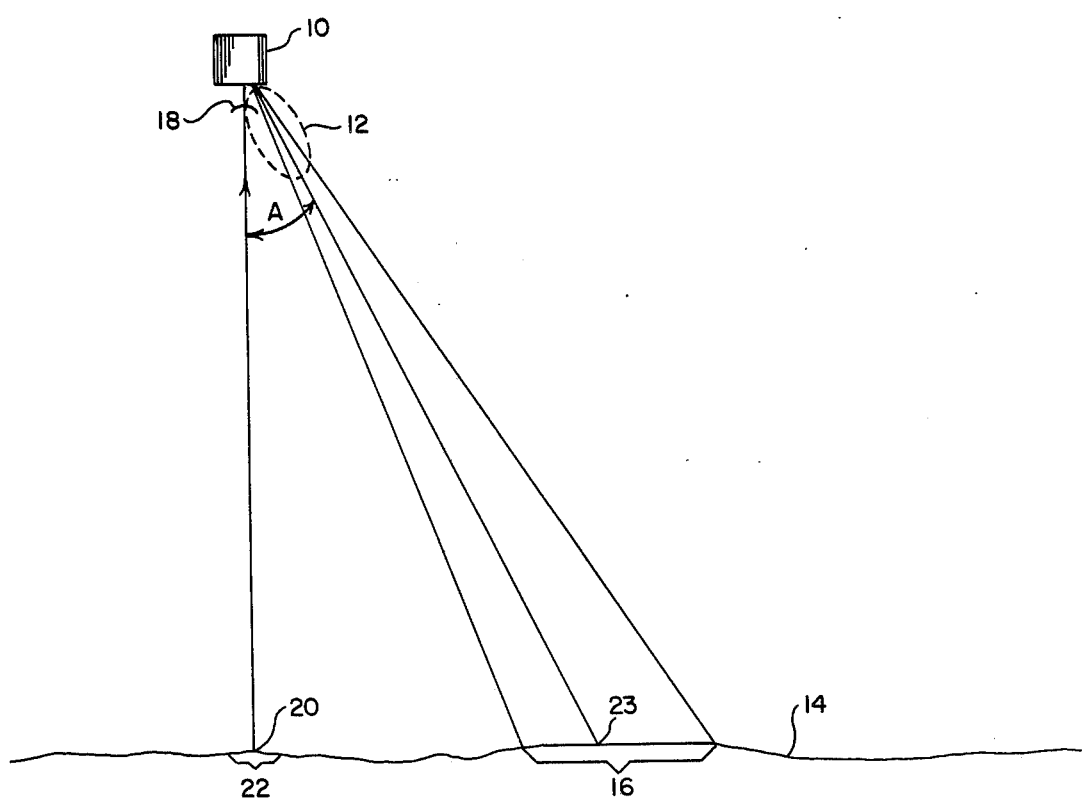
FIG. 1 is a diagrammatic representation of an orbiting spacecraft having a synthetic aperture radar and an echo tracker/altimeter provided by the present invention.

Referring to FIG. 1, an earth-orbiting spacecraft 10, which could also be an aircraft, is equipped with a synthetic aperture radar having a main lobe 12 directed at an angle A, which for example could be 15° off the nadir, at the ground 14 so as to illuminate a swath having a width shown at 16. The spacecraft 10 is also equipped with a ranging antenna 18 oriented so that its axis is directed at a location 20 whose range is to be determined. The strongest echo received by the ranging antenna 18 will be reflected from an area or swath as shown at 22 centered about the location 20. So long as sufficient energy from the main lobe 12 of the synthetic aperture radar is reflected from the location 20 to provide an echo pulse at the ranging antenna 18, or a side load from the synthetic aperture radar has sufficient energy to provide an echo pulse, the echo pulse received will have a maximum amplitude corresponding to the point 20 at which the ranging antenna axis intersects the reflecting surface. As one familiar with antennas can appreciate, if range along the line of sight of the synthetic aperture radar antenna is desired, then the ranging antenna 18 could be the same as the antenna providing the main lobe 12, or the ranging antenna 18 could be oriented so that its axis intersects a midpoint 23 dividing the swath width 16. For illustrative purposes, the echo tracker/ranging system provided by the invention is described in conjunction with a synthetic aperture radar which requires accurate range information for proper interpretation of the data contained therefrom. However, the system can be adapted to any application, either airborne or ground based in which range is to be determined.

Figure 2:
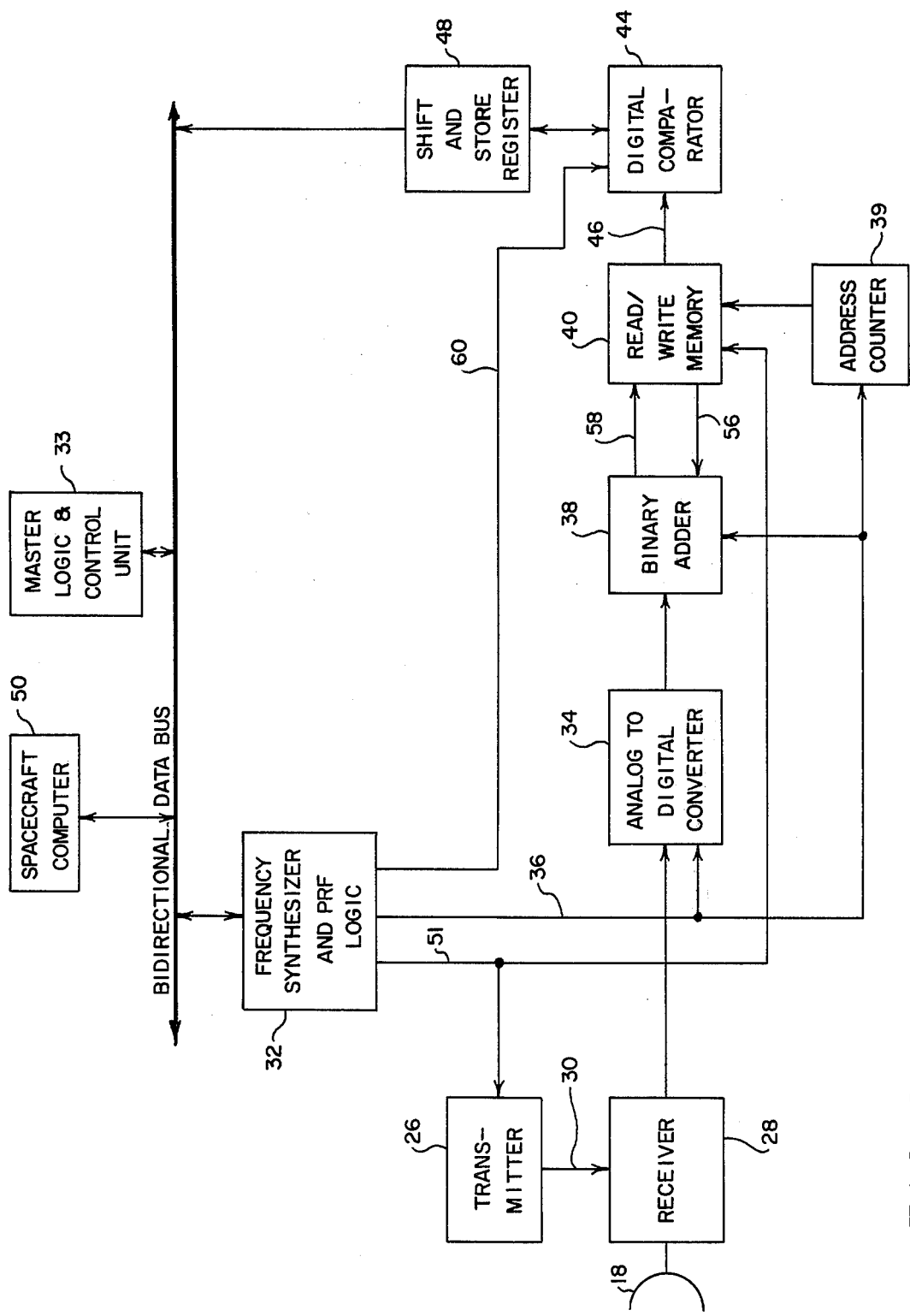
FIG. 2 is a block diagram of the echo tracker/altimeter provided by the invention.
Figure 3:
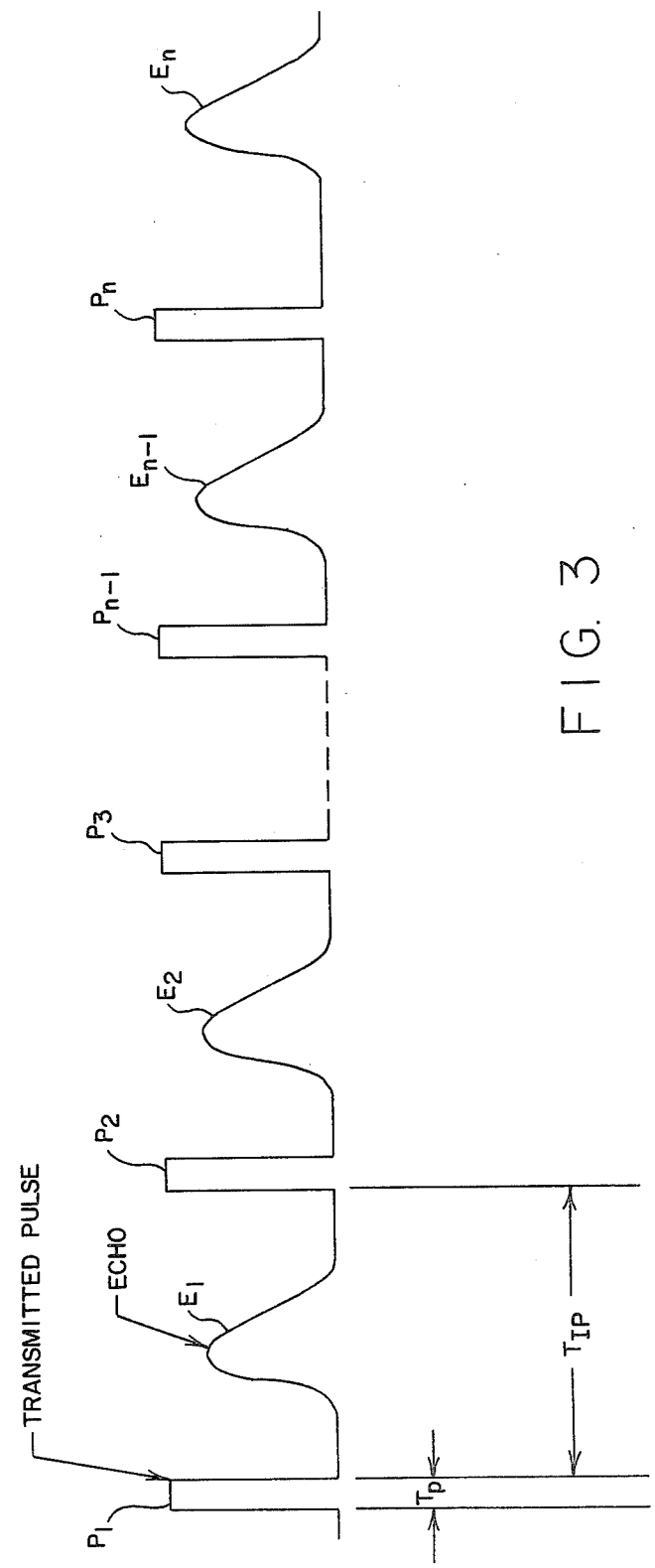
FIG. 3 is a waveform diagram showing a plurality of transmitted and echo pulses and their relationship with respect to each other.

Referring now to FIGS. 2 and 3, a radar transmitter 26 for the synthetic aperture radar transmits a plurality of pulses $P_1$ thru $P_N$. For each of the N transmitted pulses, a reflected or echo pulse is received by the ranging antenna 18 and fed to an associated radar receiver 28, the echo pulses being designated as $E_1$ thru $E_N$. Referring to FIG. 3, an echo pulse $E_1$ is shown, this pulse being an echo from a first transmitted pulse $P_1$ and being received before transmission of a second transmitted pulse $P_2$. Although in this embodiment, the first echo pulse $E_1$ is shown as resulting from the first transmitted pulse $P_1$, for applications having a long delay time between transmission and echo receipt, the echo pulse resulting from the first transmission pulse $P_1$ could occur between pulses $P_{N-1}$ and $P_N$, the additional delay being considered when converting a PRF to range. Each transmitted pulse has a time duration of Tp. A receiver disable line 30 is provided so that the radar receiver 28 can be protected during the time period Tp that the pulses $P_1$-$P_N$ are being transmitted. An interpulse time interval $T_{IP}$ is defined as the time between the trailing and leading edges of the two transmitted pulses $P_1$ and $P_2$. The reciprocal of the interpulse time interval $T_{IP}$ is the pulse repetition frequency (PRF) of the transmitted pulses. This PRF is controlled by a frequency synthesizer and PRF logic unit 32 which is responsive to PRF control signals provided by a master logic control unit 33. The frequency synthesizer and PRF logic unit 32 also includes a means for dividing each interpulse time interval $T_{IP}$ into a predetermined plurality of substantially equal time increments, this division also being controlled by the master logic control unit 33. A high speed analog to digital converter 34 is also provided, each conversion being initiated by the trailing edge of a transmitted pulse from the frequency synthesizer and PRF logic unit 32. These pulses appear on a time increment line 36 which provides inputs to both the analog to digital converter 34, a binary adder 38, and an address counter 39. A read/write memory (RAM) 40 is also provided. The address counter 39 identifies the particular time interval to the read/write memory 40 that corresponds to an output from the analog-to-digital converter 34 and the binary adder 38. A digital comparator 44 is provided to compare the digital information on an input line 46 and the contents of a shift and store register 48. The digital comparator 44 sequentially compares the digital signal on its input line 46 with a value stored in the shift and store register 48, and the signal having the highest value or magnitude between those two is stored in the shift and store register for subsequent comparison. The shift and store register 48 also stores information from the read/write memory 40 which identifies the time increment corresponding to the information stored therein. At the end of the compare period, the location of the time interval having the highest value defines the arrival time for an echo pulse profile provided by the read/write memory 40, that time then being provided to a computer 50 which in turn computes a new PRF so that the arrival time of the echo pulses would have occurred in the middle of the interpulse time period $T_{IP}$. The computer 50 provides the new PRF to the master logic control unit 33 which in turn controls the PRF as previously described.

Figure 4:
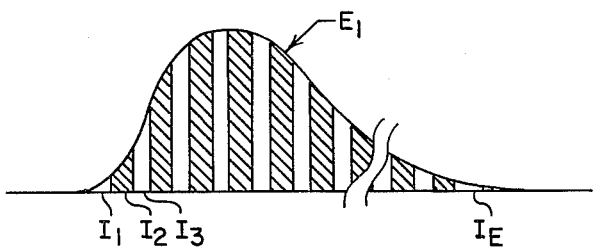
FIG. 4 is a waveform diagram showing an echo pulse divided into a plurality of time increments.

In operation, the master control logic unit 33 defines a predetermined number of pulses N to be transmitted for a particular range determination sequence. This information and a PRF which is to be utilized is provided to the frequency synthesizer and PRF logic unit 32. The frequency synthesizer and PRF logic unit 32 causes the radar transmitter 26 to transmit a plurality of pulses N by signals on a pulse transmit line 51, and the radar receiver 28 receives a corresponding plurality of echoes N. For the first echo pulse $E_1$, the analog-to-digital converter 34 samples each echo pulse portion occurring during each time increment of the interpulse time period $T_{IP}$, these time increments being defined by the master control logic unit 33 and provided to the frequency synthesizer and PRF logic unit 32 as previously explained. Referring to FIG. 4, the first echo pulse $E_1$ is divided into a plurality of time increments $I_1$ through $I_E$, the total number of time increments E being equal to the interpulse time interval $T_{IP}$. The amplitude of the echo pulse portion appearing during each of the time increments, as shown by the waveform of FIG. 4, is digitized by the analog-to-digital converter 34, provided to the binary adder 38, and then to an appropriate memory location corresponding to the particular time increment in the read/write memory 40. Upon completion of the first interpulse time interval, the read/write memory 40 will have storage locations corresponding to E time increments, each of which contains a magnitude of an echo pulse portion corresponding to that time increment. Upon completion of the first interpulse time interval associated with the first echo pulse $E_1$, initiation of the second transmitted pulse $P_2$ and the second interpulse time interval is provided to the read/write memory 40 by a pulse on the pulse transmit line 51. At this point, the cycle repeats itself except during the first time increment $I_1$ during the second interpulse time interval, the output of the analog to digital converter 32 is temporarily stored in the binary adder 38. The value in the read/write memory 40 corresponding to first time interval $I_1$ is provided on a first transfer line 56 to the binary adder 38 where it is added to the value of the first time increment $I_1$ for the second echo pulse $E_2$. The sum for echo pulses $E_1$ and $E_2$ is returned to the $I_1$ memory location in the read/write memory 40 via a second transfer line 58. This sequence is continued for each time increment until initiation of the third transmitted pulse $P_3$. At this time, the memory locations in the read/write memory 40 for each of the time increments $I_1$ thru $I_N$ contain a sum of the echo pulse portions occurring during those time increments for the first and second echo pulses $E_1$ and $E_2$. This process is completed for the total number of echo pulses N-1 which are contained between N transmitted pulses. Upon completion of processing for the N−1 echo pulses, the E time increment locations in the read/write memory 40 corresponding to each of the time increments $I_1$ thru $I_E$ define a composite echo pulse which comprises a sum of the N−1 echo pulses. A signal from the frequency synthesizer and PRF logic unit 32 is provided to the digital comparator 44 on a compare line 60 which indicates that the current ranging sequence is completed. Upon receiving this signal, the digital comparator 44 transfers from the read/write memory 40 the contents of the memory location corresponding to the first time increment $I_1$, and its corresponding address information, and stores them in the shift and store register 48. The digital comparator 44 then compares the contents from the first memory location in the read/write memory 40 corresponding to the first time increment $I_1$ with that of the second memory location corresponding to time increment $I_2$, the higher of the two and its address from the address counter 39 being transferred to the shift and store register 48 and the lower being dumped. This compare and transfer cycle is completed for the total number of time increments E. At the completion of the cycle, the contents of the shift and store register 48 identify the highest time increment value and its address location, i.e., the time increment, in which the composite echo pulse portion has the highest value. This time increment is then used as the time of arrival of the composite echo pulse. The computer 50 then computes a revised PRF which would have resulted in the composite echo pulse arriving in the middle of the interpulse time interval $T_{IP}$, this revised PRF being related to the range of the reflecting object. The next series of transmitted pulses will then be at this revised PRF. An alternate computational technique could be utilized in which the contents of the read/write memory 40 are transferred directly to the spacecraft computer 50 through the shift and store register 48. The computer 50 could then determine the location of the composite echo pulse centroid, the centroid defining the time of arrival of the pulses comprising the composite echo pulse.

The revised PRF is utilized by the computer to determine the range at which the echo pulses are originated. Thus, the PRF of the transmitted pulses is continually adjusted so that the peak of the composite echo pulse lies between the transmitted pulses. As one can appreciate, any number N of transmitted pulses could be utilized. Thus, the echo tracker/ranging system provided by the invention could utilize a single pulse or a plurality of pulses. Also, the number of time increments E could be any number, the number of increments utilized being related to the accuracy of the range determination. Also, the PRF of the transmitted pulses could be adjusted manually by an operator so that the time increment derived from the shift and store register 48 is used to center an echo between two transmit pulses.

In a typical system utilized in an orbiting spacecraft, the number of transmitted pulses N would equal 25, and the number of time increments E would equal 50. In the system such as this, the analog to digital converter 34 would quantize each echo pulse portion occurring in a time increment to a four-bit resolution. The digital comparator 44 would then utilize a 16-bit word, 10 bits corresponding to the sum in each of the time increment locations in the read/write memory 40 and 6 bits corresponding to the address location of the identified time increment. Six bits are required in order to identify each of the 50 time increments. The six-bit address corresponding to the time increment having the highest value is then utilized to define the arrival time of the composite echo pulse. If this time increment is not in the midpoint of the interpulse time interval, then the master logic control unit 33 causes the frequency synthesizer and PRF logic circuit 32 to alter the PRF. This altered PRF is then utilized by the computer 50 to compute the range to the reflecting object.

Figure 5:
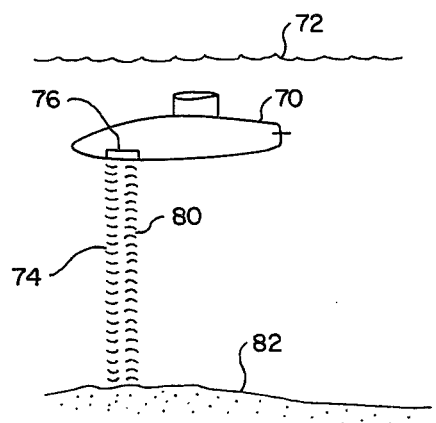
FIG. 5 is a diagrammatic representation of a submarine having a sonar system and an echo tracker/ranging system provided by the invention.

Although the invention has been described in terms of a radar transmitter and receiver, it can be readily appreciated that the teachings of the invention are in no way limited to a radar application, and are properly characterized as an echo tracker/range finder in which a pulse repetition frequency is established on the basis of a received echo, the pulse repetition frequency being related to range of the object creating the echo. Thus, the invention could also be utilized in a sound or sonar type of range finder. Such a system is shown in FIG. 5. Referring to FIG. 5, a submarine 70 below the surface 72 of a body of water transmits sound pulses 74 through a standard sonar transmitter and receiver 76. Echo pulses 80, which are reflected from the ocean floor 82, return to the sonar transmitter receiver 76. Referring again to FIG. 2, the transmitter 26 and receiver 28 are replaced by a sonar transmitter and receiver 76. The electrical signals related to the transmitted sonar pulses 74 and the echo sonar pulses 80 are processed in a manner identical to those in the radar embodiment. However, for a sonar application, the speed of pulse transmission through the water medium would result in entirely different pulse repetition frequencies.

Figure 6:
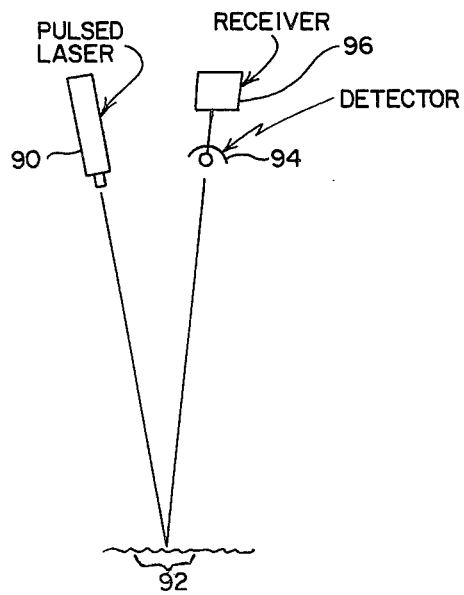
FIG. 6 is a diagramatic representation of a pulsed laser system which can be used in conjunction with an echo tracker/ranging system provided by the invention.

Another application of the invention is in conjunction with a pulsed laser system. Referring to FIG. 6, a pulsed laser source 90 directs laser pulses towards a reflecting surface 92. Reflections from the pulses are received by a detector 94 and processed by a receiver 96. The PRF of the pulsed laser source is then adjusted in a manner identical to that of the radar embodiment.

It should now be apparent from the above description that an echo tracker/ranging system has been described in which an interpulse time interval between transmitted pulses is divided into a predetermined number of time increments. Echo pulse portions received during each interpulse time interval are quantized and summed in order to provide a composite echo pulse. The peak of this composite echo pulse is determined, the peak defining the arrival time for each of the echo pulses contributing to the composite echo pulse. The pulse repetition rate for the transmitted pulses is then adjusted so that the arrival time of the composite echo pulse would have been in the middle of the interpulse time interval. The thus-defined new pulse repetition frequency is related to the range of the object creating the echo pulse, and can be used to track an echo and to calculate its range from the transmitter.

What is claimed is:

1. An echo tracker/ranging system comprising:
    means for transmitting a plurality of pulses having a predetermined pulse repetition frequency (PRF);
    means for receiving pulses reflected from an object whose range is to be measured, each reflected pulse being created by one of said transmitted pulses;
    means for dividing an interpulse time interval defined by adjacent transmitted pulses into a predetermined plurality of time increments;
    means for measuring the amplitude of each reflected pulse portion occurring during each of said predetermined plurality of time increments;
    means for identifying which of said predetermined plurality of time increments contains a reflected pulse portion having the greatest amplitude, said identified time increment defining the arrival time of the reflected pulse being measured; and
    means for altering said PRF so that said reflected pulse arrival times divide said interpulse time intervals into two portions having a predetermined ratio with respect to each other, said altered PRF being related to the range of said object.

2. The system of claim 1 wherein the interpulse time interval is the time interval between the trailing edge of one transmitted pulse and the leading edge of the next transmitted pulse, said means for altering comprises means for altering said PRF so that said echo pulse arrival time divides said interpulse time interval into two equal portions.

3. The system of claim 1 wherein said means for transmitting comprises means for transmitting a plurality of radar pulses.

4. The system of claim 1 wherein said means for transmitting comprises means for transmitting a plurality of sonar pulses.

5. The system of claim 1 wherein said means for transmitting comprises means for transmitting a plurality of laser pulses.

6. An echo tracker/ranging system comprising:
    means for transmitting a plurality of pulses having a predetermined pulse repetition frequency (PRF);
    means for receiving pulses reflected from an object whose range is to be measured, each reflected pulse being created by one of said transmitted pulses;
    means for dividing each of a predetermined plurality of interpulse time intervals into a predetermined plurality of corresponding time increments, each of said interpulse time intervals being defined by adjacent transmitted pulses;
    means for measuring the amplitude of each reflected pulse portion occurring during each of said predetermined plurality of corresponding time increments;
    means for summing reflected pulse portion amplitudes in corresponding time increments of each of said predetermined plurality of interpulse time intervals, said reflected pulse portion sums defining a composite reflected pulse;
    means for identifying which of said predetermined plurality of corresponding time increments contains the largest reflected pulse portion sum, said identified time increment defining the arrival time of said reflected pulses appearing within said predetermined plurality of interpulse time intervals; and
    means for altering said PRF so that said reflected pulse arrival times divide said interpulse time intervals into two portions having a predetermined ratio with respect to each other, said altered PRF being related to the range of said object.

7. The system of claim 6 wherein an interpulse time interval is the time interval between the trailing edge of one transmitted pulse and the leading edge of the next transmitted pulse, said means for altering comprises means for altering said PRF so that said echo pulse arrival time divides said interpulse time interval into two equal portions.

8. An echo tracker/ranging system comprising:
    means for defining a pulse repetition frequency (PRF) for a plurality of transmitted pulses;
    means for dividing the time intervals between adjacent transmitted pulsed into a predetermined plurality of corresponding time increments;
    means for measuring the amplitude of each echo pulse portion occurring during each of said predetermined plurality of corresponding time increments;
    means for summing echo pulse portion amplitudes occurring in each of said corresponding time increments for a predetermined plurality of echo pulses;

means for identifying one of said predetermined plurality of corresponding time increments having the largest summed echo pulse portion amplitude, said identified time increment defining an arrival time of said predetermined plurality of echo pulses; and means for adjusting said PRF so that said echo pulses as defined by said determined arrival time are centered between said transmitted pulses, said adjusted PRF being related to the range at which said echo pulses were originated.

9. The system of claim 8 wherein said means for transmitting comprises means for transmitting a plurality of radar pulses.

10. The system of claim 8 wherein said means for transmitting comprises means for transmitting a plurality of sonar pulses.

11. The system of claim 8 wherein said means for transmitting comprises means for transmitting a plurality of laser pulses.

12. A method of ranging comprising the steps of:
transmitting a plurality of pulses having a predetermined pulse repetition frequency (PRF);
receiving echo pulses reflected by an object whose range is to be determined, each echo pulse being created by one of said transmitted pulses;
dividing interpulse time intervals defined by adjacent transmitted pulses into a predetermined plurality of corresponding time increments;
measuring the amplitude of each echo pulse portion occurring during each of said predetermined plurality of corresponding time increments;
summing echo pulse portion amplitudes in each of said corresponding time increments for a predetermined plurality of echo pulses, said echo pulse portion sums defining a composite echo pulse;
identifying one of said predetermined plurality of corresponding time increments which contains the largest echo pulse portion sum, said identified time increment defining the arrival time of said echo pulses; and
altering said PRF so that said echo pulse arrival time divides said interpulse time interval into two portions having a predetermined ratio with respect to each other, said altered PRF being related to the range of said object.

13. The method of claim 12 wherein said interpulse time interval is the time between the trailing edge of one transmitted pulse and the leading edge of the next transmitted pulse, and said altering step comprises the step of altering said PRF so that said echo pulse arrival time divides said interpulse time interval into two equal portions.

14. The method of claim 12 wherein said transmitting step comprises the step of transmitting a plurality of radar pulses.

15. The method of claim 12 wherein said transmitting step comprises the step of transmitting a plurality of sonar pulses.

16. The method of claim 12 wherein said transmitting step comprises the step of transmitting a plurality of laser pulses.

* * * * *